Dec. 17, 1940.                F. MESINGER                2,225,317
CYCLE SADDLE
Filed April 22, 1940
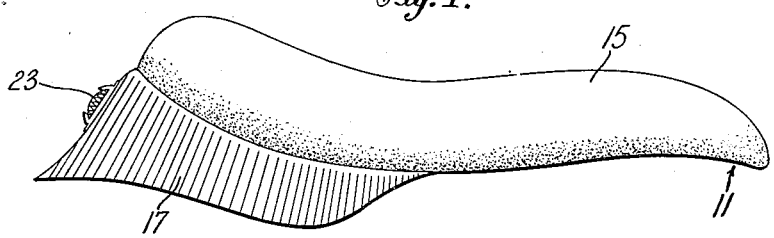
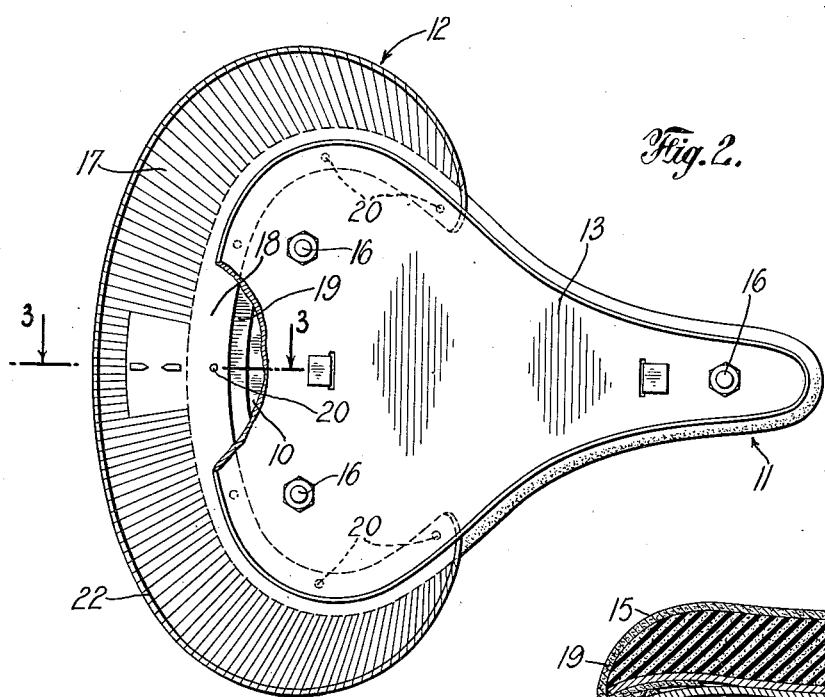
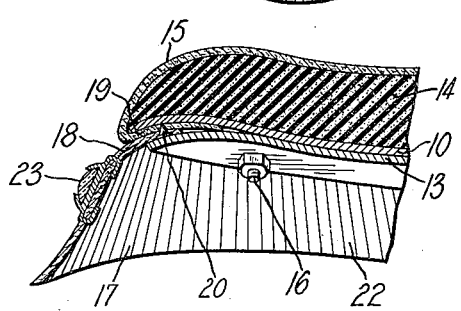
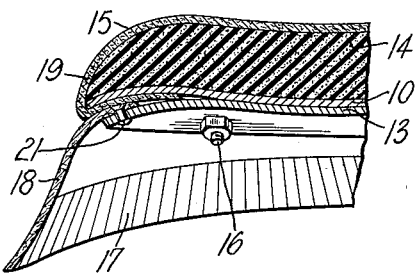
INVENTOR
FREDERICK MESINGER
BY
*William F. Mesinger*
ATTORNEY Patented Dec. 17, 1940

2,225,317

UNITED STATES PATENT OFFICE 2,225,317

CYCLE SADDLE

Frederick Mesinger, Mount Vernon, N. Y.

Application April 22, 1940, Serial No. 330,838

4 Claims. (Cl. 155—5.23)

This invention relates to bicycle saddles and more particularly to the seat portion of a bicycle saddle.

If it was desired to provide a downwardly projecting skirt at the rim or the rear portion of a saddle seat, it was necessary to either sew such skirt to the peripheral edges of the saddle or to extend the top cover sufficiently to form such skirt. In the latter case the skirt portion must be of the same material as the top covering and considerable difficulty in forming the top to the desired shape is experienced. The former method can only be practiced with saddles having a projecting fabric or leather edge to which the skirt material can be stitched. Neither procedure can be practiced when the saddle top is so constructed that the edges of the top covering are turned inward and clamped between a base plate and a clamping plate.

The principal objects of the present invention are therefore to provide a cycle saddle seat having a downwardly projecting skirt portion; to provide such a seat in which the skirt portion may be of different material than the seat top covering and secured without stitching; in which the skirt portion may be firmly secured to the seat without leaving any exposed edge; and to provide such a seat which shall have a pleasing appearance, be efficient and durable in use and be economical to manufacture.

These and other objects of the invention will become apparent from the following description taken in connection with the appended drawing in which:

Fig. 1 is a side elevational view of a saddle seat with depending skirt according to the present invention;

Fig. 2 is a bottom plan view with parts broken away showing the construction;

Fig. 3 is a fragmentary view of a section taken on the line 3—3 of Fig. 2 on an enlarged scale; and Fig. 4 is a fragmentary sectional view showing an alternative form of attachment of a skirt.

Referring to the drawing, the saddle seat comprises a shaped stiff sheet metal base 10 of generally triangular outline and formed to have a forward relatively narrow pommel portion 11 and a relatively wide rear (or cantle) portion 12. The peripheral edges of the base 10 are preferably formed downwardly. Secured against the bottom face of the base 10 is a clamping plate 13 having a similar outline and shape but slightly smaller in size than the base 10. The plate 13 does not have downwardly formed edges like the base. On the top face of the base 10 is preferably provided a layer of cushioning material such as hair felt or sponge rubber 14 and this is covered by an outer covering 15 of suitable sheet material such as coated fabric or leather. The outer or top covering is carried around the peripheral edges of the base 10 and inwardly against the underside of the base between the base and the clamping face. This forms a saddle of pleasing appearance and having smooth rounded edges that are not unpleasant to touch. The clamping plate and base are secured tightly together by suitable fastenings such as bolts 16 which serve also to secure the seat supporting frame which is not shown in the interests of clearness of the drawing.

To hide the seat frame or spring structure and to form a supporting means for a safety reflector or the like, there is provided a downwardly depending skirt 17. The skirt 17 may be made of a sheet material similar to the top covering but may with advantage be of a different material or of a different thickness. The upper edge portion 18 of the skirt 17 is secured to the seat preferably as shown in Figs. 2 and 3 by securing the edge portion 18 to the surface of the inwardly extending edge portion 19 of the top covering. The edge portions 18 and 19 may be cemented together and then both clamped tightly between the base 10 and the clamping plate 13. As shown, several short tacks 20 secure the edge portions 18 and 19 together and the clamping plate 13 covers the tacks 20 and holds them securely against displacement. A quickly assembled and very secure attachment of the skirt is thus provided. Alternatively, the skirt edge may be secured to the clamping plate 13 as illustrated in Fig. 4 by rivets 21 passing through the plate and skirt. The skirt may be secured either against the bottom face or against the top face of the clamping plate as shown by the rivets 21.

The skirt may be secured completely around the periphery of the saddle or only around the rear portions as illustrated. It will be obvious that the skirt may be decorated or treated in various ways according to the effects desired or the object to be supported, for example, the skirt may be slitted with vertically extending cuts 22 as shown to produce the effect of a fringe. The rear portion of the skirt may serve as a support such as for a safety reflector 23 which is secured thereto and serves as a tail light substitute.

It will be understood that changes may be made in the details of construction herein disclosed without departing from the spirit of the invention.

What is claimed is:

1. A cycle saddle seat comprising a base having downwardly curved edges; a clamping plate secured to the underside of said base; a top covering having edge portions passed around and under the edge portions of said base and secured between said base and said clamping plate; and a depending skirt having an upper edge portion secured between said base and said clamping plate.

2. A cycle saddle seat comprising a base having downwardly curved edges; a clamping plate secured to the underside of said base; a top covering having edge portions passed around and under the edge portions of said base; and a depending skirt having an upper edge portion secured to the edge portion of said top covering, both the edge portion of said top covering and the edge portion of said skirt being clamped between said base and said clamping plate.

3. A cycle saddle seat comprising a base having downwardly curved edges; a clamping plate secured to the underside of said base; a top covering having edge portions passed around and under the edge portions of said base and a depending skirt having an upper edge portion secured by tacks to the edge portion of said top covering, said tacks and the edge portions of said top covering and said skirt being clamped between said base and said clamping plate.

4. A cycle saddle seat comprising a base having downwardly curved edges; a clamping plate secured to the underside of said base; a top covering having edge portions passed around and under the edge portions of said base and a depending skirt having an upper edge portion secured to the edge portions of said clamping plate.

FREDERICK MESINGER.